United States Patent [19]

Quarve et al.

[11] Patent Number: 5,242,271
[45] Date of Patent: Sep. 7, 1993

[54] ROTARY POWER FILL DEVICE

[75] Inventors: Vernon K. Quarve, Minneapolis; Mark A. King, Blaine, both of Minn.

[73] Assignee: Graco Inc., Minneapolis, Minn.

[21] Appl. No.: 889,484

[22] Filed: May 27, 1992

[51] Int. Cl.$^5$ ................................. F04B 9/12
[52] U.S. Cl. ........................... 417/46; 417/47; 417/63; 417/406
[58] Field of Search ............... 417/46, 47, 406, 63; 73/861.78, 261

[56] References Cited

U.S. PATENT DOCUMENTS

| | | | |
|---|---|---|---|
| 2,752,858 | 7/1956 | Berges | 417/47 |
| 3,087,650 | 4/1963 | Reed et al. | 222/14 |
| 3,207,368 | 9/1965 | Runge . | |
| 3,651,989 | 3/1972 | Westrich . | |
| 3,831,812 | 8/1974 | Dolan . | |
| 4,016,893 | 4/1977 | Scott | 417/406 |
| 4,057,173 | 11/1977 | Tal . | |
| 4,403,926 | 9/1983 | Stamper | 417/553 |
| 4,518,101 | 5/1985 | Robinson . | |
| 4,568,248 | 2/1986 | Harders . | |
| 4,639,202 | 1/1987 | Mahanay | 417/406 |
| 4,641,522 | 2/1987 | Lopresti | 73/261 |

Primary Examiner—Richard A. Bertsch
Assistant Examiner—David W. Scheuermann
Attorney, Agent, or Firm—Douglas B. Farrow

[57] ABSTRACT

A device for dispensing oils, antifreeze and other fluids from drums or other bulk containers has a rotary air motor which powers a gerotor-type pumping element. The pumping element has at least one magnet thereon and an electronics package is provided which counts the number of magnetic pulses which occur during the rotation of the gerotor and converts it over to the quantity of material pumped. A valve controls the flow of air to the air motor which in turn allows an operator to control the dispensing of fluid from the outlet of the pumping element.

4 Claims, 1 Drawing Sheet

ROTARY POWER FILL DEVICE

BACKGROUND OF THE INVENTION

Devices for dispensing various lubricants and other related materials such as antifreeze are of course varied and well-known. Such dispensing devices have typically included an air-operated reciprocating pump such as the Graco Inc. FASTBALL® 1:1 transfer pump connected to a mechanical meter such as those manufactured by Badger, the outlet of the meter having a fluid valve thereon for controlling flow of fluid through the device. Such dispensing apparatus while effective, are relatively undesirable due to their large number of parts and concurrent expense.

SUMMARY OF THE INVENTION

It is therefore an object of this invention to provide a pumping and dispensing apparatus which may be easily and inexpensively manufactured and which will accurately measure the amount of fluid dispensed and which in turn can be easily controlled by the operator.

Towards this end, a rotary air motor has an output shaft which has mounted thereon a rotary pumping element such as a gerotor set. The gerotor set has mounted thereon at least one magnet the rotation of which is counted by an electronics mechanism similar to that utilized in the Graco Inc. electronic fluid meter, the details of which are shown in U.S. Pat. No. 4,848,164, the contents of which are hereby incorporated by reference.

Accordingly, the pumping element also serves to act as the metering or measuring element. To control this device then, the operator need merely turn air to the rotary air motor on and off to dispense fluid from the dispense nozzle. An inlet tube to the pumping element may be attached to the bung of a bulk container such as a 55-gallon drum.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

FIG. 1 shows a side sectional view of the instant invention.

DESCRIPTION OF THE PREFERRED EMBODIMENT

Figure 1:
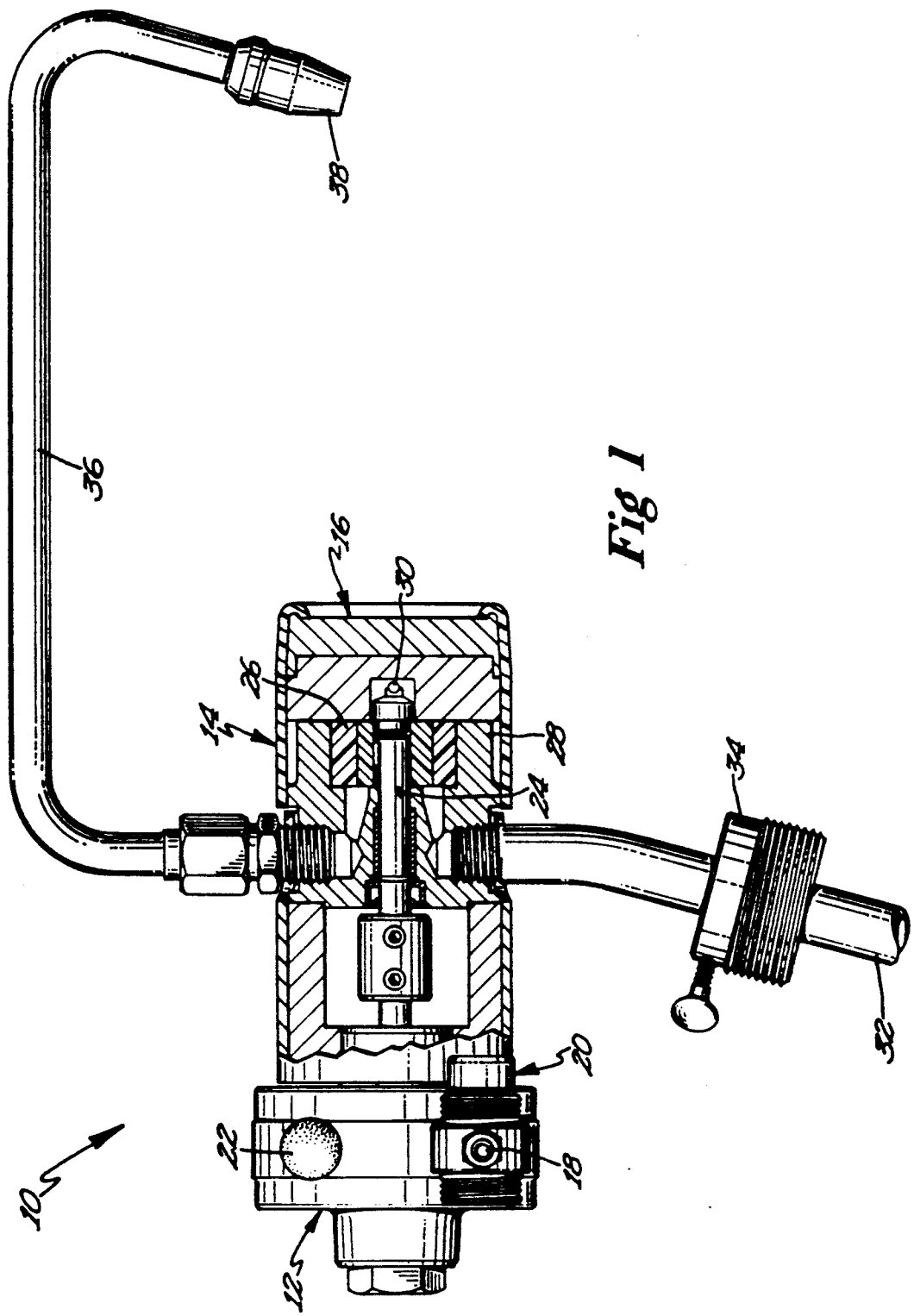

The instant invention, generally designated 10 in FIG. 1, is comprised of an air motor 12, a pumping mechanism 14, and a display and electronics package 16. Air motor 12 is provided with an air inlet 18 controlled by an air valve 20 which may be manually operated by the operator. Any sort of manually operable air valve is suitable for such an application.

The air motor 12 utilized can be one of any of a number of well known rotary air motors such as those which are manufactured by Gast and also has associated with it a muffler 22 and an output shaft 24. Mounted on output shaft 24 is a gerotor element 26 which is located in a pump housing 28.

Gerotor element 26 has at least one magnet 30 thereon, the rotation of which produces pulses which may be detected and analyzed by display and electronics module 16 to output the amount of fluid which is discharged through the pumping and metering element 26.

Fluid intake to the device 10 is provided by an intake tube 32 which may be utilized in conjunction with a bung adapter 34 which may screw into a bulk container such as a 55 gallon drum. An outlet tube 36 is provided with a nozzle 38 for dispensing of the fluid.

Thus, a compact, inexpensive-to-manufacture package may be used to dispense such fluids as may be desired from bulk containers with a minimum of effort. The only plumbing required is that the device is inserted in the bulk container and that an air line is attached; with dispensing taking place by the operator pushing the button or pulling the lever on valve 20. The readout of electronic module 16 may be as desired by the operator and as detailed in the aforementioned U.S. Pat. No. 4,848,164.

It is contemplated that various changes and modifications may be made to the fluid pumping and dispensing device without departing from the spirit and scope of the invention as defined by the following claims.

What is claimed is:

1. A fluid pumping and dispensing device, said device comprising:
   a rotary air motor having an input for attachment to a source of compressed air and an output shaft;
   a rotary pumping element attached to said output shaft, said pumping element having at least one magnet thereon;
   means for detecting and counting pulses of said magnet as said pumping element rotates and for displaying the amount of fluid pumped; and
   means for controlling the supply of air to said air motor input.

2. The fluid pumping and dispensing device of claim 1 wherein said rotary pumping element comprises a gerotor.

3. The fluid pumping and dispensing device of claim 1 wherein said pumping element further comprises an intake tube.

4. The fluid pumping and dispensing device of claim 3 wherein said intake tube comprises means for mounting in a bung opening.

* * * * *